UNITED STATES PATENT OFFICE.

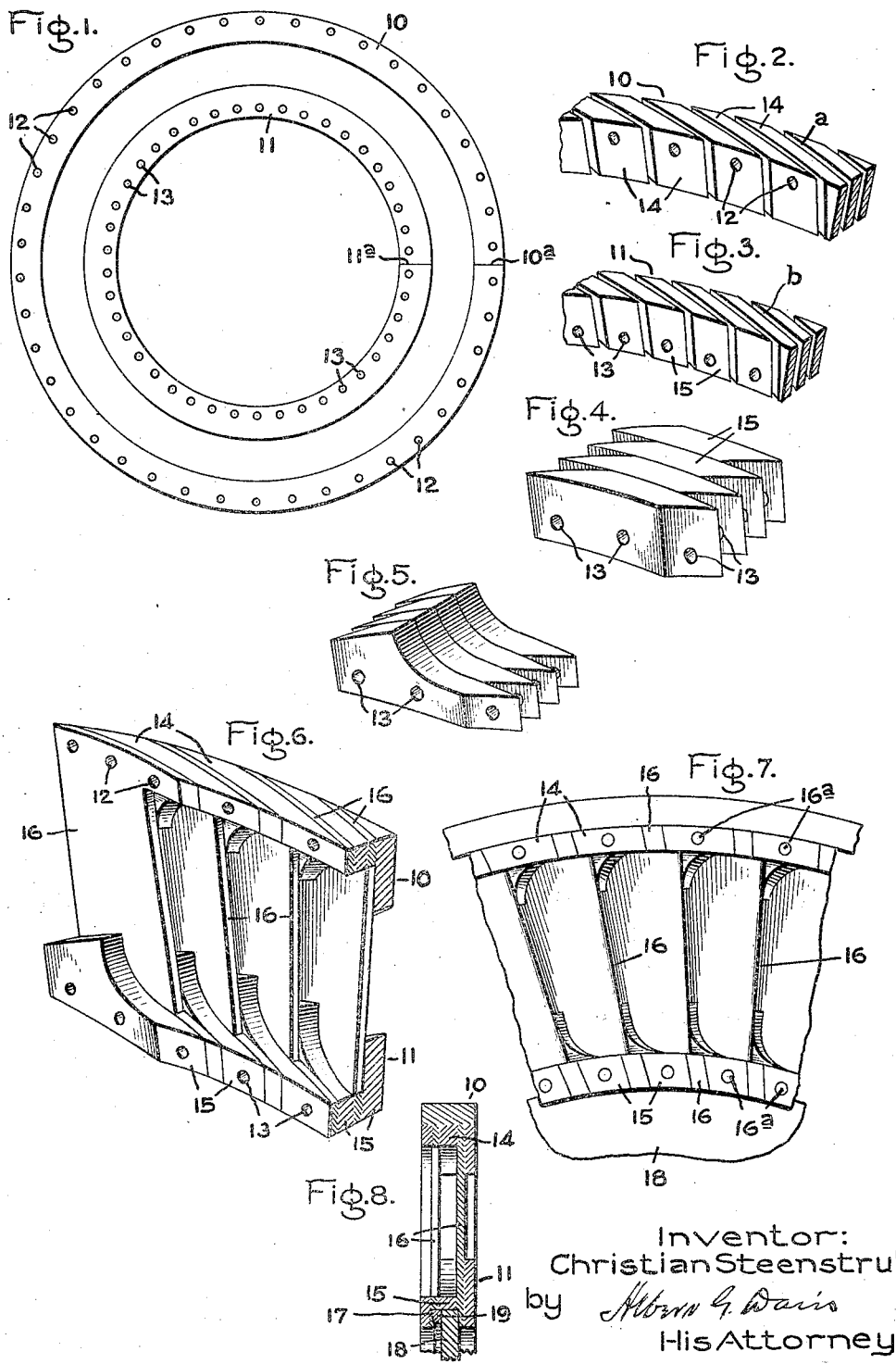

CHRISTIAN STEENSTRUP, OF SCHENECTADY, NEW YORK, ASSIGNOR TO GENERAL ELECTRIC COMPANY, A CORPORATION OF NEW YORK.

METHOD OF MANUFACTURING NOZZLE-DIAPHRAGMS FOR ELASTIC-FLUID TURBINES.

1,390,835. Specification of Letters Patent. Patented Sept. 13, 1921.

Application filed August 17, 1920. Serial No. 404,242.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Manufacturing Nozzle-Diaphragms for Elastic-Fluid Turbines, of which the following is a specification.

The present invention relates to nozzle diaphragms for elastic fluid turbines which, as is well known, comprise in substance, a partition member which extends across the turbine casing to divide it into stages, each partition member carrying a ring of nozzles for directing elastic fluid from one stage to the next, discharging it against the rotating buckets of such next stage. The object of my invention is to provide an improved method of manufacturing nozzle diaphrams, and for a consideration of what I believe to be novel and my invention, attention is directed to the accompanying description and the claims appended thereto.

In the drawing, Figure 1, is a side elevation of two rings used in carrying out my invention; Figs. 2, 3, 4 and 5 are perspective views illustrating steps in carrying out my invention; and Fig. 6 is a perspective view, Fig. 7 is a side elevation, and Fig. 8 a transverse section of a completed diaphragm built in accordance with my improved method.

In carrying out my invention, I take two rings 10 and 11 rectangular in cross section and of such diameter that when placed concentric as shown in Fig. 1 the space between them is substantially equal to the radial depth desired for the nozzles. Rings 10 and 11 may be made in any suitable manner and finished to the desired dimensions by machining and grinding; for example, they may be made from bar stock rolled up and joined by welding as indicated at 10$^a$ and 11$^a$. In rings 10 and 11, I drill spaced transverse holes 12 and 13 respectively, the holes 12 being adjacent the outer edge of ring 10 and the holes 13 being adjacent the inner edge of ring 11. Holes 12 and 13 are spaced apart a distance equal to the spaces between diaphragm partitions. Rings 10 and 11 are next cut entirely through along the lines *a* and *b* as shown in Figs. 2 and 3 respectively, there being a cut between each of the holes 12 and 13 which holes serve, in the first instance, as an index for this cutting operation. The cuts are radial in one direction and oblique in the other and result in dividing each ring into a number of substantially prismatic blocks 14 and 15 respectively. The oblique angle on which the rings are cut is the same as that desired for the nozzle partitions in the completed diaphragm and the cuts may be of a width equal to the thickness of the nozzle partitions, or they may be of greater thickness as found desirable.

After the rings have been cut into blocks, the blocks of each ring are taken a suitable number at a time and shaped to form walls of the current contour for the bowls and throats of the nozzles. This work may be performed on a milling machine, and as is obvious the inner portion of the outer ring 10 and the outer portion of the inner ring 11 are the parts to be shaped as these define the radially outer and inner surfaces of the nozzles. In Figs. 4 and 5 I have illustrated the manner of shaping the blocks of the inner ring 11 and it will be understood that the blocks of the outer ring are shaped in a similar and complementary manner. A number of the blocks 15 are stacked together as shown in Fig. 4 and may be clamped in an ordinary milling machine vise and shaped for the bowl and throat of the nozzle. This gives them the shape shown in Fig. 5.

After all the blocks 14 and 15 have been shaped, they are then reassembled as two concentric rings, nozzle partitions 16 being placed between the blocks as shown in Figs. 6, 7 and 8.

Nozzle partitions 16 may be stamped from plate material of suitable thickness and are provided along their edges with holes adapted to aline with holes 12 and 13 in blocks 14 and 15. Accordingly, when the blocks and nozzle partitions are assembled to form a nozzle ring the holes will come in line and the assembled structure may be fastened together by rivets 16$^a$ inserted through such holes. In some instances this riveting may be sufficient to hold the diaphragm structure. If found desirable I may, however, in addition to or in lieu of the rivets, unite the structure into an integral whole by fusion of metal, as by welding, brazing, soldering or the like, and in Figs. 7 and 8 I have indicated the structure as being thus united.

After the nozzle ring structure has been built up, I then finish the surfaces to dimension, turn a groove 17 in the inner ring, and split the ring horizontally so as to make it into upper and lower halves. This split is best made through the joints 10ª since then it is not necessary to have initially a perfect uniting of the rings at these points, the uniting being of only a temporary nature. An annular plate 18, split horizontally is then fastened in groove 17 as by means of a calking strip 19. This forms the web member of the diaphragm and it will be understood that it provides the usual shaft opening at its center through which the shaft passes and between which and the shaft is the usual shaft packing.

By my above described method, I am enabled to manufacture diaphragms of great strength at a low manufacturing cost. At the same time the diaphragms will be accurately dimensioned and all fluid passages finished. Furthermore, while a number of steps are involved, all are of a simple nature, readily performed, and require no special or complicated machinery.

In accordance with the provisions of the patent statutes, I have described the principle of operation of my invention, together with the particular method which I now consider to represent the best manner for carrying it out, but I desire to have it understood that the particular method disclosed is only illustrative and that the invention may be carried out with such modifications as come within the scope of the appended claims.

What I claim as new and desire to secure by Letters Patent of the United States, is:—

1. The method of manufacturing a nozzle ring for elastic fluid turbines which comprises taking two rings, cutting them into prismatic blocks, shaping surfaces of said blocks to form walls of the correct contour for the nozzle passages, assembling the blocks into rings with nozzle partitions between the blocks, and permanently uniting the assembled structure by fusion of metal.

2. The method of manufacturing a nozzle ring for elastic fluid turbines which comprises taking two rings, cutting them into prismatic blocks, the width of the cuts being substantially equal to the thickness of the nozzle partitions, shaping surfaces of said blocks to form walls of the correct contour for the nozzle passages, assembling the blocks into rings with nozzle partitions between the blocks, and permanently uniting the assembled structure by fusion of metal.

3. The method of manufacturing a nozzle ring for elastic fluid turbines which comprises taking two concentric rings, cutting them into prismatic blocks, shaping the inner surfaces of the blocks from the outside ring and the outer surfaces of the blocks from the inside ring to form walls of the correct contour for the nozzle passages, assembling the blocks into rings with nozzle partitions between the blocks, permanently uniting the assembled structure, dividing it horizontally into halves, and mounting the halves on web members.

4. The method of manufacturing a nozzle ring for elastic fluid turbines which comprises taking two concentric rings, boring circumferentially spaced holes therein, cutting the rings into prismatic blocks, shaping surfaces of said blocks to form walls of the correct contour for nozzle passages, assembling the blocks into rings with nozzle partitions between the blocks, and uniting the assembled structure by rivets inserted in the spaced holes.

5. The method of manufacturing a nozzle ring for elastic fluid turbines which comprises taking two concentric rings, boring circumferentially spaced holes therein, cutting the rings into prismatic blocks, shaping surfaces of said blocks to form walls of the correct contour for nozzle passages, assembling the blocks into rings with nozzle partitions between the blocks, uniting the assembled structure by rivets inserted in the spaced holes, and then further uniting the structure by fusion of metal.

6. The method of manufacturing a nozzle ring for elastic fluid turbines which comprises taking two concentric rings, boring circumferentially spaced holes therein, cutting the rings into prismatic blocks, shaping surfaces of said blocks to form walls of the correct contour for nozzle passages, assembling the blocks into rings with nozzle partitions between the blocks, uniting the assembled structure by rivets inserted in the spaced holes, and then attaching the nozzle ring thus formed to a web member.

In witness whereof, I have hereunto set my hand this 16th day of August, 1920.

CHRISTIAN STEENSTRUP.